United States Patent Office 2,866,724
Patented Dec. 30, 1958

2,866,724

COATED EVAPORATING ELEMENTS AND METHOD OF UTILIZING SAME

Paul Alexander, Princeton, N. J., assignor, by mesne assignments, to Continental Can Company, Inc., New York, N. Y., a corporation of New York No Drawing. Application March 15, 1954
Serial No. 416,435

15 Claims. (Cl. 117—228)

This invention relates to coating in vacuum by continuous evaporation of metals. By "continuous evaporation," as distinct from "batch coatings," I mean any method in which the metal is evaporated during a prolonged period and the objects or materials to be coated are passed through the zone of the metal vapor. In the "batch coating" methods, a number of distinct objects are coated by placing them around sources of evaporation and these objects are coated in the operation in which the evaporation of the metal takes only a few seconds; whilst in the "continuous coating" the metal is evaporated continuously during a period of up to several hours. This can be done essentially in two general ways. One way is to evaporate the metal from a container or crucible which is heated to the required temperature; and the other way is to feed the metal continuously or intermittently onto an evaporating element which is kept at the required temperature. In practice, the continuous feeding method has proved to be more successful because of such advantages as the absence of limitation on the quantity of metal to be evaporated, simplicity of heating, constant rate of evaporation, and others. Some metals are highly reactive at high temperatures and are solvents for practically all metals and most other materials. Amongst such metals are aluminum, which is commercially the most important one for evaporation, titanium, zirconium, chromium, and others. In the case of these metals, the most important and most difficult problem is to find a material which is suitable to constitute the evaporating element and lasts long enough, without being dissolved, or rendered ineffective by the metal to be evaporated from it.

In the first process, which has gained practical importance and which is described in my prior Patent No. 2,153,786, dated April 11, 1939, a tungsten rod was used as an evaporating element for aluminum. Tungsten as an evaporating element has many advantages, in having a high melting point, in being easily wetted by aluminum, and simple to heat by electric current, but as it is not insoluble in aluminum at high temperatures, such elements do not last longer than one hour under the most favorable conditions.

Carbon is another eminently suitable material for an evaporating element because of its high melting point and low vapor pressure, and because it is easily and economically fabricated. However, aluminum combines with carbon at high temperatures, forming aluminum carbide and many other metals are similarly carbide forming. A carbon evaporator, such, for instance, as is described in Patent to Bancroft, No. 2,557,530, dated June 19, 1951, or any other shape of carbon container, is of very limited use for the evaporation of aluminum and some other metals, because the formation of aluminum carbide or the carbides of the other metals, which occurs after very brief periods of use, retards the evaporation of aluminum or the other metals, and in a short time destroys the element.

It has been suggested to cover the surface of a carbon element with a carbide of titanium, zirconium or of some other metals in order to form a protective barrier between the aluminum and the carbon and prevent the formation of aluminum carbide. However, the protection so provided is very limited and though such a protected carbon element is superior to bare carbon, its lasting qualities, and therefore its utilitarian life, are not satisfactory enough.

In pending patent specifications, Serial Numbers 208,-162 and 291,506, carbon elements are described which are protected with two layers, one layer being titanium or zirconium carbide and the top layer being essentially free metallic titanium or zirconium. Thus, the carbide coating acts as a barrier between the carbon and the metallic titanium or zirconium from which the aluminum is evaporated. Some aluminum diffuses through the titanium or zirconium reaching the carbide and the carbon, and therefore the life of such an evaporating element is of limited duration, but nevertheless the protection provided is much better than that of the carbides alone; and such elements are durable enough for many practical purposes.

According to the present invention a very superior protection can be achieved by covering the surface of a carbon base of appropriate shape with a layer of a silicide of the metals tungsten, molybdenum, tantalum or niobium. It is important, of course, that the portion of the surface of the finished evaporating element from which aluminum or some other metal is to be evaporated should be entirely covered with a layer of silicide which should be not less than about .3 mm. thick. Either of the above mentioned silicides provides a suitable protective covering, or alternatively any combination of them can be used.

The best way to compare the merits of respective evaporating elements is to measure the amount of aluminum which can be evaporated from a unit surface area before the element becomes inefficient or inoperative. The following figures present a comparison between a number of elements heretofore proposed or actually used in practice, and the evaporating element of the present invention:

| Element | Gr. of aluminum evaporated per cm.² of surface |
|---|---|
| tungsten rod according to Pat. No. 2,153,786 | 1.1 |
| bare carbon | .5 |
| Titanium carbide coated carbon | 3.9 |
| Zirconium carbide coated carbon with free zirconium metal on top; Ratio ZrC;Z=10:90 | 9.00 |
| Tungsten silicide coating on top of carbon, coating .8 mm. thick | 18.00 |

There are various methods available for preparing elements which consist of silicide covered carbon bases. The carbon bases themselves can be shallow containers of elongated shape, heated by electric current going through them, or shallow circular containers heated by induction electric current, or simply a carbon rod of round, flat, or square cross section. The following methods of preparing them serve as examples:

(1) A thorough mixture is made of the metal (W, Mo, Ta for Nb) and silicon in powder or finely granulated form, the composition being somewhat richer in silicon than the stoichiometric ratio, e. g. 60% W plus 40% Si, 58% Mo plus 48% Si, 60% Ta plus 40% Si, 50% Nb plus 50% Si. This mixture is applied to the surface of the carbon base simply by piling it on it, the surface being horizontal. Otherwise, it can be applied with a brush in the form of a thick suspension in acetone, alcohol or some other suitable liquid. Thereupon, the carbon base with the mixture thereon is heated gradually in a vacuum until the reaction between the metal and the silicon starts, which is at around 1500° C. At this point, the heat of reaction added to the heating effect of the electric current, raises the temperature in the vicinity of the mixture rapidly. The temperature must be raised to the melting point of the particular silicide involved, which will be between 2000° C. and 2500° C. As soon as the silicide layer has melted, flowed freely, and coated the carbon surface evenly, the heating is stopped and the element is ready for use.

Alternatively, the firing, i. e. the high temperature treatment, of the element can be done instead of in a vacuum, in an atmosphere of an inert gas, such as argon.

(2) Another method of preparing the silicide covered elements is to prepare a mixture of the metal (W, Mo, Ta or Nb) with copper silicide or a mixture of copper and silicon, apply the mixture to the carbon base surface, and fire in the same way as in 1. The advantage of this method is that the copper silicide melts at a lower temperature and the reaction starts in the liquid state. For this method an argon atmosphere is more suitable than vacuum, but the element has to be heated up to 1800° to 2000° C. in a vacuum before usage in order to evaporate the surplus copper from it.

(3) It is also possible to use a mixture of the metal oxide powder, silicon dioxide powder and aluminum or magnesium powder, and otherwise proceed as in 1 and 2. In this case, the coating will contain aluminum or magnesium oxides which I have found of no disadvantage in evaporating aluminum from it.

While I have described my invention specifically, it is apparent that changes or modifications may be made therein without departing from the spirit of the invention. For example, I have mentioned only the silicides of the metals tungsten, molybdenum, tantalum and niobium, but the silicides of other metals can be used as well, the limitation being that the silicide be stable and have a melting point above 1500° C. Thus, silicides of thorium, hafnium or zirconium might be used in addition to those of the metals already enumerated.

I claim:

1. An evaporating element for use in a vacuum metallizing apparatus, made of carbon having a covering thereon essentially comprised of the silicide of a metal selected from the group consisting of tungsten, molybdenum, tantalum, and niobium.

2. An evaporating element for use in a vacuum metallizing apparatus, made of carbon having a covering thereon essentially comprised of a combination of silicides of metals selected from the group consisting of tungsten, molybdenum, tantalum, and niobium.

3. An evaporating element for use in a vacuum metallizing apparatus, made of carbon having a covering thereon essentially comprised of tungsten silicide.

4. An evaporating element for use in a vacuum metallizing apparatus, made of carbon having a covering thereon essentially comprised of molybdenum silicide.

5. An evaporating element for use in a vacuum metallizing apparatus, made of carbon having a covering thereon essentially comprised of tantalum silicide.

6. An evaporating element for use in a vacuum metallizing apparatus, made of carbon having a covering thereon essentially comprised of niobium silicide.

7. The method for preparing an evaporating element comprising the application of a mixture of particles of silicon and particles of a metal selected from the group consisting of tungsten, molybdenum, tantalum, and niobium to the surface of a carbon base, and the subsequent fusion of said mixture in a vacuum.

8. The method for preparing an evaporating element comprising the application of a mixture of particles of silicon and particles of a metal selected from the group consisting of tungsten, molybdenum, tantalum, and niobium to the surface of a carbon base, and the subsequent fusion of said mixture in an inert gas atmosphere.

9. The method for preparing a silicide coated evaporating element, comprising the application of a mixture of particles of a metal selected from the group consisting of tungsten, molybdenum, tantalum and niobium and particles of copper silicide to the surface of a carbon base, then fusing said mixture in an inert gas atmosphere, and the subsequent heating in a vacuum of said element to a temperature sufficiently high to remove excess copper.

10. The method for preparing a silicide coated evaporating element, comprising the application of a mixture of particles of a metal selected from the group consisting of tungsten, molybdenum, tantalum and niobium and particles of copper silicide to the surface of a carbon base, then fusing said mixture in a vacuum, and the subsequent heating in a vacuum of said element to a temperature sufficiently high to remove excess copper.

11. A method for depositing a metal film on a surface in which the vapor of the metal to be deposited is created by evaporation in a vacuum of the metal from an evaporating element made of carbon having a covering thereon essentially comprised of a silicide of a metal selected from the group consisting of tungsten, molybdenum, tantalum, and niobium, said surface being exposed to said vapor in vacuum.

12. A method for depositing a metal film on a surface in which the vapor of the metal to be deposited is created by evaporation in a vacuum of the metal from an evaporating element made of carbon having a covering thereon essentially comprised of tungsten silicide, said surface being exposed to said vapor in vacuum.

13. A method for depositing a metal film on a surface in which the vapor of the metal to be deposited is created by evaporation in a vacuum of the metal from an evaporating element made of carbon having a covering thereon essentially comprised of molybdenum silicide, said surface being exposed to said vapor in vacuum.

14. A method for depositing a metal film on a surface in which the vapor of the metal to be deposited is created by evaporation in a vacuum of the metal from an evaporating element made of carbon having a covering thereon essentially comprised of tantalum silicide, said surface being exposed to said vapor in vacuum.

15. A method for depositing a metal film on a surface in which the vapor of the metal to be deposited is created by evaporation in a vacuum of the metal from an evaporating element made of carbon having a covering thereon essentially comprised of niobium silicide, said surface being exposed to said vapor in vacuum.

References Cited in the file of this patent

UNITED STATES PATENTS

| | | |
|---|---|---|
| 1,249,637 | Keyes | Dec. 11, 1917 |
| 1,312,257 | King | Aug. 5, 1919 |
| 2,597,964 | Winter | May 27, 1952 |
| 2,612,442 | Goetzel | Sept. 30, 1952 |
| 2,614,947 | Heyroth | Oct. 21, 1952 |
| 2,665,475 | Campbell et al. | Jan. 12, 1954 |
| 2,745,932 | Glaser | May 15, 1956 |